United States Patent
Tokita (12)

(10) Patent No.: US 6,784,238 B2
(45) Date of Patent: Aug. 31, 2004

(54) PRIMER COMPOSITION

(75) Inventor: Suguru Tokita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/069,550

(22) PCT Filed: Jul. 4, 2001

(86) PCT No.: PCT/JP01/05797

§ 371 (c)(1),
(2), (4) Date: Feb. 27, 2002

(87) PCT Pub. No.: WO02/02703

PCT Pub. Date: Jan. 10, 2002

(65) Prior Publication Data

US 2002/0156164 A1 Oct. 24, 2002

(30) Foreign Application Priority Data

Jul. 4, 2000 (JP) ............................ 2000-202136

(51) Int. Cl.[7] ............ C08F 8/00; C08L 51/00; C08C 19/00
(52) U.S. Cl. ............ 524/504; 523/201; 525/384
(58) Field of Search ............ 524/504; 523/201; 525/384

(56) References Cited

U.S. PATENT DOCUMENTS 4,146,590 A * 3/1979 Yamamoto et al.
6,211,290 B1 * 4/2001 Xiao et al.

FOREIGN PATENT DOCUMENTS

| GB | 2265626 A | 10/1993 |
|----|-----------|---------|
| JP | 3-52983 A | 3/1991 |
| JP | 5-279622 A | 10/1993 |
| JP | 8-003505 A | 1/1996 |
| JP | 8-100032 A | 4/1996 |
| JP | 11-217537 A | 8/1999 |

* cited by examiner

Primary Examiner—Tae H. Yoon
(74) Attorney, Agent, or Firm—Birch, Stewart, Kolasch & Birch, LLP

(57) ABSTRACT

A primer composition comprises (I) a modified copolymer obtainable by addition of a polar group represented by the following formula (1) or (2) to at least one (co)polymer selected from an olefin (co)polymer, a halogenated olefin (co)polymer, a styrene/conjugated diene/styrene tri-block copolymer or its hydrogenated product and a halogenated styrene/conjugated diene/styrene tri-block copolymer or its hydrogenated product, wherein the modified copolymer contains the polar group in an amount of from $1 \times 10^{-3}$ to $250 \times 10^{-3}$ mol based on 100 g of the modified copolymer, and (II) an organic solvent;

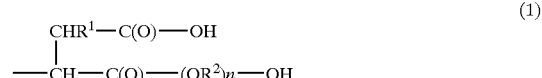

(1)

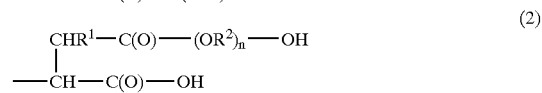

(2)

in the formulas (1) and (2), $R^1$ is hydrogen or an alkyl group of 1 to 6 carbon atoms, $R^2$ is an alkylene group of 1 to 6 carbon atoms and n is an integer of 1 to 20.

The present invention can provide the primer composition having excellent adhesion between polyolefin molded articles or steel plates, which are substrates (coated objects), and various materials (coating materials, adhesives and the like) and further having excellent storage stability and pigment-loading properties.

4 Claims, No Drawings

PRIMER COMPOSITION

This application is the national phase under 35 U.S.C. §371 of PCT International Application No. PCT/JP01/05797 which has an International filing date of Jul. 4, 2001, which designated the United States of America.

FIELD OF THE INVENTION

The present invention relates to a primer composition for coating and bonding molded articles of polyolefins such as polypropylene or the like, particularly, relates to a primer composition showing excellent storage stability for storing under mixing with water-containing substances such as pigments, water or moisture.

BACKGROUND OF THE INVENTION

Conventionally, molded articles of polyolefins such as polypropylene have been enhanced in their values by application of paints or formation of resin layers other than polyolefin to the surfaces thereof. However, polyolefins generally have a small polarity and inferior adhesion to general coating materials or other resins. On this account, the adhesion of a polyolefin molded article to coating materials or the like has conventionally been improved by enhancing the surface polarity thereof with treatment of the polyolefin molded article surface using chromic acid, flame, corona, plasma or solvents.

These methods, however, have defects that they require complicated treatments, are accompanied with danger of using corrosive chemicals and also require strict process control for obtaining stable adhesiveness.

The present applicant discloses, in JP-B-62-21027/1987 and JP-B-59-42693/1984, that using, as a primer (surface treating agent), a solution of dissolving a graft copolymer obtainable by graft co-polymerization of a propylene/ethylene copolymer or ethylene/propylene copolymer with maleic anhydride in an organic solvent, the adhesion between a coated object (for example, polyolefin molded articles such as polypropylene molded articles) and a coating material or adhesive is improved to attain good adhesion.

These primer compositions can exert good adhesion between a substrate (coated object) and a coating material or adhesive. However, when they are kept for a long time under water or moisture contact conditions, the problem of increasing their viscosities will be induced, and when water-containing products such as pigments are added to them, foreign matters will be produced or increasing their viscosities will be induced.

In order to solve these problems, the present applicant proposed, in JP-B-61-11250/1986, a primer composition (surface treating agent) prepared by dissolving a modified ethylene/propylene copolymer, which is obtainable by grafting a mono-olefin dicarboxylic acid monoalkyl ester, in an organic solvent.

The above problems for the primer compositions are solved, however, they are found to have a defect of lowering the adhesion with a specific coating material or a specific adhesive.

Therefore, the advent of primer compositions having excellent adhesion between a polyolefin molded article, which is a substrate (coated object) and various materials (coating materials, adhesives or the like), and excellent storage stability and pigment-loading properties has been desired.

The present invention is intended to solve the problems associated with the prior art as mentioned above. It is an object of the invention to provide a primer composition having excellent adhesion between a polyolefin molded article, which is a substrate (coated object) and various materials (coating materials, adhesives or the like), and excellent storage stability and pigment-loading properties.

DISCLOSURE OF THE INVENTION

The primer composition of the present invention comprises:

(I) a modified copolymer obtainable by addition of a polar group represented by the following formula (1) or (2) to at least one (co)polymer selected from
   (A) an olefin (co)polymer,
   (B) a halogenated olefin (co)polymer
   (C) a styrene/conjugated diene/styrene tri-block copolymer or its hydrogenated product and
   (D) a halogenated styrene/conjugated diene/styrene tri-block copolymer or its hydrogenated product, and (II) an organic solvent, wherein the modified copolymer contains the polar group in an amount of from $1 \times 10^{-3}$ to $250 \times 10^{-3}$ mol based on 100 g of the modified copolymer,

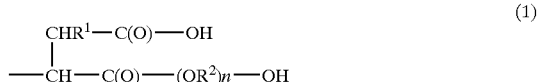

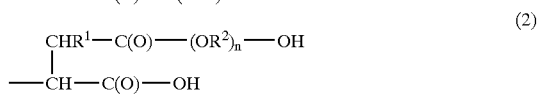

in the formulas (1) and (2), $R^1$ is hydrogen or an alkyl group of 1 to 6 carbon atoms, $R^2$ is an alkylene group of 1 to 6 carbon atoms and n is an integer of 1 to 20.

The primer composition of the present invention preferably has a content of the organic solvent (II) of from 100 to 4000 parts by weight based on 100 parts by weight of the modified copolymer (I).

BEST MODE OF CARRYING OUT THE INVENTION

The primer composition of the present invention will be described in detail hereinafter.

The primer composition of the present invention comprises (I) the specific modified copolymer and (II) the organic solvent.

Modified Copolymer (I)

The modified copolymer (I) used for the invention is a graft-modified product of at least one (co)polymer selected from (A) an olefin (co)polymer, (B) a halogenated olefin (co)polymer, (C) a styrene/conjugated diene/styrene tri-block copolymer or its hydrogenated product and (D) a halogenated styrene/conjugated diene/styrene tri-block copolymer or its hydrogenated product, and has the specific polar group.

[(A) Olefin (Co)polymer]

The olefin (co)polymer (A) used for the invention is a homopolymer of at least one α-olefin or a copolymer comprising at least two α-olefins.

Exemplary α-olefins are α-olefins of 2 to 20 carbon atoms, preferably 2 to 8 carbon atoms, and specifically may include ethylene, propylene, 1-butene, 4-methyl-1-pentene, 3-methyl-1-pentene, 1-hexene, 2-methyl-1-pentene, 1-heptene and 1-octene.

Among of the α-olefin (co)polymers, it is preferred to use a propylene/ethylene copolymer, propylene/1-butene copolymer and ethylene/1-octene copolymer as the olefin (co)polymer (A).

The intrinsic viscosity [η] as measured in decalin at 135° C. of the olefin (co)polymer (A) is desirably in the range of 0.05 to 5.0 dl/g, preferably 0.1 to 2.0 dl/g.

[(B) Halogenated Olefin (Co)polymer]

The olefin (co)polymers for the halogenated olefin (co) polymer (B) used in the invention may include, for example, the above-described olefin (co)polymers (A).

Examples of the halogen used in the halogenation of the olefin (co) polymer (A) may include fluorine, chlorine and bromine.

The degree of halogenation varies depending on the kinds of substrate to be subjected to primer treatment and coating objects such as coating materials and adhesives, and further, is desirably in the range of generally 5 to 40% by weight, preferably 10 to 30% by weight based on 100% by weight of the olefin (co) polymer before the halogenation.

[(C) Styrene/Conjugated Diene/Styrene Tri-Block Copolymer or Its Hydrogenated Product]

The styrene/conjugated diene/styrene tri-block copolymer or its hydrogenated product (C) used in the present invention is a copolymer which comprises a polymer block (S) having at least one recurring structural unit derived from styrene in its molecule and a conjugated diene polymer block (Di) having at least one recurring structural unit derived from conjugated diene in its molecule and has, for example, a structure represented by the following formula:

$$-(S-Di-S)_n-$$

in the formula, n is an integer of 1 or more.

Examples of the conjugated diene for the styrene/conjugated diene/styrene tri-block copolymer may include isoprene and butadiene. The tri-block copolymer may contain the conjugated diene singly or in combination with two or more.

Preferably, the styrene content of the tri-block copolymer is generally 10 to 55% by weight, particularly 15 to 50% by weight.

The styrene/conjugated diene/styrene tri-block copolymer or its hydrogenated product used in the invention has a number average molecular weight (Mn) of preferably from $1 \times 10^4$ to $18 \times 10^4$, more preferably $1.5 \times 10^4$ to $12 \times 10^4$. In the present invention, the number average molecular weight (Mn) is determined using tetrahydrofurane as a solvent at 40° C. by gel permeation chromatography (GPC).

[(D) Halogenated Styrene/Conjugated Diene/Styrene Tri-Block Copolymer or its Hydrogenated Product]

The styrene/conjugated diene/styrene tri-block copolymer or its hydrogenated product for the halogenated styrene/conjugated diene/styrene tri-block copolymer or its hydrogenated product (D) used in the invention is, for example, the styrene/conjugated diene/styrene tri-block copolymer or its hydrogenated product (C).

Examples of the halogen used for halogenation of the styrene/conjugated diene/styrene tri-block copolymer or its hydrogenated product (C) may include fluorine, chlorine and bromine.

The degree of halogenation varies depending on the kinds of substrate to be subjected to primer treatment and coating objects such as coating materials and adhesives, and further, is desirably in the range of generally 5 to 40% by weight, preferably 10 to 30% by weight based on 100% by weight of the styrene/conjugated diene/styrene tri-block copolymer or its hydrogenated product before the halogenation.

[Polar Group]

The polar group which is added to the (co)polymer as described above is represented by the following formula (1) or (2).

$$\begin{array}{c} \text{CHR}^1-\text{C(O)}-\text{OH} \\ | \\ -\text{CH}-\text{C(O)}-(\text{OR}^2)_n-\text{OH} \end{array} \quad (1)$$

$$\begin{array}{c} \text{CHR}^1-\text{C(O)}-(\text{OR}^2)_n-\text{OH} \\ | \\ -\text{CH}-\text{C(O)}-\text{OH} \end{array} \quad (2)$$

In the formulas (1) and (2), $R^1$ is hydrogen or an alkyl group of 1 to 6 carbon atoms, $R^2$ is an alkylene group of 1 to 6 carbon atoms and n is an integer of 1 to 20.

Examples of the alkyl group of 1 to 6 carbon atoms for $R^1$ may include methyl, ethyl, propyl, isopropyl, butyl, isobutyl, s-butyl, t-butyl, pentyl, isopentyl, t-pentyl, neopentyl, 1-methylbutyl, hexyl, and isohexyl groups.

Examples of the alkylene group of 1 to 6 carbon atoms for $R^2$ may include methylene, ethylene, propylene, trimethylene, butylene, pentene and hexene groups.

The process for adding the polar group of the formula (1) to the above (co)polymer may include a process of conducting graft copolymerization of a compound having the polar group of the formula (1) to the (co)polymer directly. It is, further, preferred to employ a process of previously conducting graft-copolymerization of an unsaturated dicarboxylic acid represented by the formula (a) or (b) or its acid anhydride to the (co)polymer and then allowing to react with a diol compound represented by the formula (c) in view of preparing the modified copolymer (I) in a high yield.

$$\begin{array}{c} \text{HC}=\text{CR}^1 \\ | \quad\quad | \\ \text{HOOC} \quad \text{COOH} \end{array} \quad (a)$$

$$\begin{array}{c} \text{HC} \quad\quad \text{CR}^1 \\ | \quad\quad | \\ \text{O}=\text{C} \quad \text{C}=\text{O} \\ \backslash\;/ \\ \text{O} \end{array} \quad (b)$$

$$H(OR^2)_nOH \quad (c)$$

Preferable examples of the diol compound may include glycols such as ethylene glycol, diethylene glycol and triethylene glycol because of having a high reactive efficiency.

Examples of the unsaturated dicarboxylic acid or its acid anhydride may include maleic acid, fumaric acid, tetrahydrophthalic acid, itaconic acid, citraconic acid, crotonic acid, isocrotonic acid, norbornene dicarboxylic acid, tetra hydrophthalic acid and bicyclo[2,2,1]hepto-2-ene-5,6-dicarboxylic acid, or their acid anhydrides, and particularly, the acid anhydrides thereof are preferred.

These unsaturated dicarboxylic acids and their acid anhydrides may be used singly or in combination with two or more.

The process for graft copolymerization of at least one polar compound selected from the above unsaturated dicarboxylic acids and their acid anhydrides on the above (co) polymer may include various processes. Examples thereof are:

(1) a process of conducting graft copolymerization by dissolving the (co)polymer in an organic solvent, adding the polar compound and a radical polymerization initiator and heating them with stirring;

(2) a process of conducting graft copolymerization by melting the (co)polymer with heating, adding the polar compound and a radical polymerization initiator to the resulting melt and stirring them;

(3) a process of conducting graft copolymerization by previously mixing the (co)polymer with the polar compound and a radical polymerization initiator, feeding the resulting mixture to an extruder and kneading the mixture with heating; and (4) a process of conducting graft copolymerization by impregnating a solution prepared by dissolving the polar compound and a radical polymerization initiator in an organic solvent, into the (co)polymer, and then heating them to the highest temperature at which the (co)polymer is not dissolved.

The reaction temperature is not lower than 50° C., suitably from 80 to 200° C., and the reaction time is about from 1 to 10 hours.

The reaction method may be any one of batch wise and continuous methods, and further the batch wise method is preferable in order to carry out the graft copolymerization uniformly.

In conducting the polymerization using the radical polymerization initiator, the useful radical polymerization initiator may include any one which can promote the reaction of the (co)polymer with the polar compound, and particularly an organic peroxide and organic perester are preferable.

Examples of the organic peroxide may include benzoyl peroxide, dichloro benzoyl peroxide, dicumyl peroxide, di-tert-butyl peroxide, 2,5-dimethyl-2,5-di(peroxy benzoate)hexyne-3,1,4-bis(tert-butylperoxy isopropyl) benzene, lauroyl peroxide, 2,5-dimethyl-2,5-di(tert-butylperoxy)hexyne-3 and 2,5-diemthyl-2,5-di(tert-butyl peroxide)hexane.

Examples of the organic perester may include tert-butylperacetate, tert-butylbenzoate, tert-butyl perphenyl acetate, tert-butyl perisobutylate, tert-butyl per-sec-octoate, tert-butyl perpivalate, cumyl perpivalate and tert-butyl per-diethyl acetate.

Usable examples of the radical polymerization initiator may include azo compounds such as azobisisobutyronitrile, and dimethyl azoisobutyronitrile.

Among these compounds, dialkyl peroxides such as dicumyl peroxide, di-tert-butyl peroxide, 2,5-dimethyl-2,5-di(tert-butyl peroxy)hexyne-3,2,5-dimethyl-2,5-di(tert-butyl peroxy)hexane, and 1,4-bis(tert-butyl peroxy isopropyl) benzene are preferable.

It is preferred to use the radical polymerization initiator in an amount of about 0.001 to 10 parts by weight based on 100 parts by weight of the (co)polymer.

The modified copolymer (I) used in the invention is obtainable by allowing the acid modified (co)polymer thus prepared to react with the above diol compound.

This reaction may be carried out in the same way as the above acid modification reaction (graft copolymerization reaction) with or without using the radical polymerization initiator.

The modified copolymer (I) having the polar group of the formula (1) can be prepared by the above process, and contains the polar group of the formula (1) in an amount of from $1 \times 10^{-3}$ to $250 \times 10^{-3}$ mol based on 100 g of the modified copolymer (I) and preferably $10 \times 10^{-3}$ to $100 \times 10^{-3}$ mol with the view of improving the adhesion between molded articles and coating materials or adhesives.

Organic Solvent (II)

In the preparation of the modified copolymer (I) used for the invention, the graft copolymerization reaction may be carried out in the presence or absence of the organic solvent, as described in the above. In the present invention, a composition prepared by dissolving the modified copolymer (I) in the organic solvent (II) is used as the primer composition.

Accordingly, when the modified copolymer (I) is prepared by graft copolymerization in the organic solvent, it may be used as the primer composition of the invention as it is or with the same or other kind of the organic solvent (II) newly added.

On the other hand, when the modified copolymer (I) is prepared by graft copolymerization in the absence of the organic solvent, the modified copolymer (I), which is a graft product, is dissolved by newly adding the organic solvent (II) and then used as the primer composition of the invention.

The organic solvent (II) for forming the primer composition of the invention, which is added in the graft copolymerization reaction or after the reaction, is not particularly limited, and examples thereof may include:

aromatic hydrocarbons such as benzene, toluene or xylene;

aliphatic hydrocarbons such as hexane, heptane, octane or decane;

alicyclic hydrocarbons such as cyclohexane, cyclohexene or methylcyclohexane;

alcohols such as methanol, ethanol, isopropyl alcohol, butanol, pentanol, hexanol, propanediol or phenol;

ketones such as acetone, methyl isobutyl ketone, methyl ethyl ketone, pentanone, hexanone, isophorone or acetophenone;

cellosolves such as methyl cellosolve or ethyl cellosolve;

esters such as methyl acetate, ethyl acetate, butyl acetate, methyl propionate or butyl formate; and halogenated hydrocarbons such as trichloroethylene, dichloroethylene or chlorobenzene.

Among these, aromatic hydrocarbons, aliphatic hydrocarbons and ketones are preferable. These organic solvents (II) may be used singly or in combination with two or more.

In the present invention, the desirable content of the organic solvents (II) is preferably from 100 to 4000 parts by weight, more preferably 200 to 2000 parts by weight based on 100 parts by weight of the modified copolymer (I).

Primer Composition

The primer composition of the invention comprises the modified copolymer (I) and the organic solvent (II), as described in the above, and is essentially used as a surface treating agent for plastic molded articles.

The surface of a molded article made of olefin (co) polymers or other (co)polymers is coated with the primer composition of the present invention and dried, and thereafter the primer composition coated surface is coated with a coating material, and thereby the adhesion between the molded article and the coating material can be improved. Similarly, the primer composition coated surface is coated with an adhesive, and thereby the adhesion between the molded article and the adhesive can be improved.

Preferable examples of the above molded article may include molded articles made of polyolefins such as high-pressure polyethylene, moderate or low-pressure polyethylene, polypropylene, poly-4-methyl-1-pentene or polystyrene, and molded articles made of olefin copolymers such as ethylene/propylene copolymer, ethylene/butene copolymer or propylene/butene copolymer.

Further, in addition to the above polyolefins and olefin copolymers, the primer composition of the invention can be used in molded articles made of polypropylene and synthetic rubber, molded articles for automobiles made of polyamide resin, unsaturated polyester resin, polybutylene terephthalate resin or polycarbonate resin, and surface treatment for steel plates or electrodeposition-treated steel plates.

Further, prior to the application of coating materials, primers excluding the primer composition of the present invention and adhesives which essentially comprise polyurethane resin, aliphatic acid modified polyester resin, oil-free polyester resin, melamine resin or epoxy resin to the surfaces of molded articles, under-coat with the primer composition of the invention is previously conducted, thereby improving the adhesion between the molded articles and coating materials, primers and adhesives, and forming coating films (coating material-coated films, primer films and adhesive films) having excellent clearness and impact resistance at low temperatures.

Particularly, application of undercoating with the primer composition of the present invention is suitable for improving the adhesiveness of coating materials to the surfaces of molded articles. Applicable molded articles are molded articles made of polyolefins such as polypropylene or the like, car bumpers made of polypropylene and synthetic rubber, molded articles of instrument panels, SMC (sheet molding compound) molded articles obtainable by using unsaturated polyester resin, epoxy resin etc, R-RIM (Reinforced reaction injection molding) molded articles of polyurethane resin, glass fiber-reinforced polyamide resin molded articles, polyurethane resin molded articles and cation electrodeposition-coated steel plates.

The molded articles on which the primer composition of the present invention is applied, may be prepared by molding the above various (co)polymers or resins by means of any known molding methods including injection molding, compression molding, blow molding, extrusion molding and rotational molding.

Application of the primer composition of the invention on even molded articles mixed with pigments or inorganic fillers such as talc, zinc white, glass fiber, titanium white or magnesium sulfate can form a primer coating film having excellent adhesion.

Further, the molded articles to which the primer composition of the invention is applicable may contain various additives such as stabilizers, ultraviolet light absorber or hydrochloric acid-absorbent in addition to the above inorganic fillers and pigments.

The process for application of the primer composition of the invention on the surfaces of molded articles is not particularly limited. The application can be conducted by known processes such as bar coater, roll coater, dipping and spraying coatings.

The application of the primer composition of the invention on molded articles is conducted at ordinary temperatures. The wet coating film of the primer composition applied on the surfaces of molded articles is dried by appropriate processes such as air-drying or forced drying with heat to thereby form a hardened coating film (primer coating film) of the primer composition of the present invention on the surface of the molded article.

As described in the above, the primer composition of the present invention is applied on the surface of a molded article and dried, and thereafter a coating material and an adhesive can be applied on the surface of the molded article by any one of processes of bar coater, roll coater, dipping, spraying and brushing coatings.

The employable coating material is not particularly limited. Particularly, in the case of application using a solvent type thermoplastic acrylic resin-coating material, solvent type thermosetting acrylic resin coating material, acryl modified alkyd resin coating material, epoxy resin coating material, polyurethane resin coating material and melamine resin coating material, the use of the primer composition of the present invention can develop good adhesion.

Further, the employable adhesive is not particularly limited. Employable examples thereof are urea resin adhesive, melamine resin adhesive, acrylic resin adhesive, epoxy resin adhesive, urethane resin adhesive, phenol resin adhesive, vinyl acetate solvent type adhesive, synthetic rubber solvent type adhesive, chloroprene solvent type adhesive, natural rubber solvent type adhesive, vinyl acetate resin emulsion type adhesive, vinyl acetate copolymer resin emulsion type adhesive, EVA emulsion type adhesive, acrylic resin emulsion type adhesive, urethane resin emulsion type adhesive and epoxy resin emulsion type adhesive.

The primer composition of the present invention is applicable for widespread uses with making the best use of its properties in addition to the above use of the primer for the molded articles. For example, it is applicable for uses such as additives for adhesives, additives for coating materials and binders for glass fiber.

EFFECT OF THE INVENTION

The present invention can provide the primer composition having excellent adhesion between polyolefin molded articles or steel plates, which are substrates (coated objects), and various materials (coating materials, adhesives or the like), and further having excellent storage stability and pigment-loading properties.

EXAMPLE

Hereinafter, the present invention is further described with reference to the following non-limiting examples.

In the examples and comparative examples, the storage stability test of the primer composition and physical property test of the coating film were carried out in accordance with the following methods.

[1] Storage Stability Test

The primer composition was regulated with toluene to have a solid concentration of 8.5% by weight and 1000 ppm of water was added to them and stirred. The appearance and viscosity (Ford cup viscosity No. 4) of the resulting mixture were measured every 10 days until 30 days.

[2] Cross Cut Test

A specimen having cross cuts was prepared in accordance with a method for cross cut test as defined in JIS K5400, and a cello tape (Trade name manufactured by Nichiban Co.) was adhered to the cross cuts of the specimen. Thereafter the tape was drawn quickly at a direction of 90° to peel it off and the number of cross cuts from which the coating film was not peeled off was counted within 100 cross cuts and was taken as an indication of the adhesion of the coating film.

[3] Peeling Strength Test

A coating film was formed on a substrate and a cut having a 1 cm width was formed with a cutter until the edge of the cutter reached to the substrate, then the edge of the coating film was released. Thereafter, the released edge of the coating film was pulled at a direction of 180° C. at a rate of 50 mm/min until the coating film was peeled off and then peeling strength [g/cm] was measured.

Example 1

112.5 g of a propylene/ethylene copolymer having an ethylene content of 40 mol % and an intrinsic viscosity [η]

as measured in decalin at 135° C. of 2.0 dl/g and 392 g of toluene were charged to a 1 L volume autoclave with a stirrer, heated to 145° C. and stirred to dissolve them completely.

Next, while this solution was kept at 145° C. with stirring, 10.4 g of maleic anhydride and 3.6 g of di-tert-butylperoxide were added dropwise respectively to the solution over 4 hr. After completion of the addition, the post-reaction was carried out with stirring the mixture at 145° C. for 2 hr to obtain a reaction solution (a) including a maleic anhydride-grafted copolymer.

After completion of the reaction, the solution was cooled to room temperature and acetone was added to the solution to deposit the maleic anhydride-grafted copolymer. The deposited maleic anhydride-grafted copolymer was washed with acetone repeatedly and then dried, and a specimen of the maleic anhydride-grafted copolymer was prepared.

The resulting specimen of the maleic anhydride-grafted copolymer has an intrinsic viscosity [η] as measured in decalin at 135° C. of 1.1 dl/g and a grafted amount of maleic anhydride of $46 \times 10^{-3}$ mol based on 100 g of the grated copolymer.

In the next place, to the reaction solution (a), 4.4 g of diethylene glycol (available by Mitsui Chemicals Inc.) (equimolar based on the maleic anhydride charged) was added, heated to 165° C. and allowed to react for 5 hr to obtain a specimen of a modified copolymer.

As a result of IR analysis of the resulting specimen of the modified copolymer, the degree of the reaction of diethylene glycol was 80% and the content of a polar group represented by the following formula corresponding to the formula (1) was $37 \times 10^{-3}$ mol per 100 g of the modified copolymer.

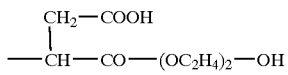

Subsequently, 42.5 g of this modified copolymer was dissolved in 457.5 g of toluene, which is an organic solvent, to prepare a primer composition (solution).

Then, a solution prepared by adding 30 parts of xylene to 100 parts of the primer composition was applied with spraying on a polypropylene square plate whose surface had been cleaned with isopropyl alcohol (polypropylene Trade Name X708, manufactured by Grand Polymer Co.) so as to be a dried coating film thickness of 3 μm and dried naturally to form a primer coating film on the square plate surface.

In the next place, on the primer coating film, a facing material (Trade Name R-278 (white) two-component urethane resin coating material, manufactured by Nippon Bee Chemical Co. Ltd.) was applied to form a coating film having a dried coating film thickness of 30 μm. The coated plate was allowed to stand at room temperature for 10 min, then put into an air oven heated at 100° C. and baked for 30 min to prepare a specimen for the cross cut test. The cross cut test was carried out using the specimen in accordance with the above method.

Similarly, a specimen having a dried facing material-coated film thickness of 100 μm for the peeling test was prepared in the same manner and the peeling test thereof was conducted in accordance with the above method.

The results are shown in Table 3.

Further, with reference to the primer composition (solution), the storage stability test was conducted in accordance with the above method. The results of observing the appearance of the primer composition are shown in Table 1, and the change of the viscosity with time is shown in Table 2.

Comparative Example 1

5.2 g of methanol (4 times by mol based on the amount of maleic anhydride added dropwise in the reaction) was added to the reaction solution (a) including the maleic anhydride-grafted copolymer synthesized in Example 1, heated to 165° C. and reacted for 5 hr. After the reaction, the solution was cooled to room temperature to prepare a specimen of a modified copolymer.

As a result of IR analysis of the resulting specimen modified copolymer, the degree of the esterification with methanol was 95% (the degree of the esterification was taken as 200% when all maleic anhydride was dimethyl ester).

Then, 42.5 g of the modified copolymer was dissolved in 457.5 g of toluene being an organic solvent to prepare a primer composition (solution).

Using the primer composition, the coating test including the cross cut test and the peeling test, and the storage stability test were conducted in the same manner as in Example 1. The results are shown in Tables 1, 2 and 3.

Comparative Example 2

Using the reaction solution (a) including the maleic anhydride-grafted copolymer synthesized in Example 1, as a primer composition, the coating test including the cross cut test and the peeling test, and the storage stability test were conducted in the same manner as in Example 1. The results are shown in Tables 1, 2 and 3.

TABLE 1

Storage Stability

Appearance of Primer composition

| | After 10 days | After 20 days | After 30 days |
|---|---|---|---|
| Example 1 | Transparent | Transparent | Transparent |
| Compara. Ex. 1 | Transparent | Transparent | Transparent |
| Compara. Ex. 2 | Opaque | Opaque | Opaque |

TABLE 2

Storage Stability

Viscosity Change of Primer composition with time

| | Initial viscosity [sec] | Viscosity after 10 days [sec] | Viscosity after 20 days [sec] | Viscosity after 30 days [sec] |
|---|---|---|---|---|
| Example 1 | 20 | 20 | 20 | 20 |
| Compara. Ex. 1 | 18 | 18 | 18 | 19 |
| Compara. Ex. 2 | 17 | 20 | 36 | 48 |

TABLE 3

| | Coating film properties | |
|---|---|---|
| | Cross cut test Number of cross cuts with coating film remained/100 | Peeling strength [g/cm] |
| Example 1 | 100/100 | 1050 |
| Compara. Ex. 1 | 100/100 | 640 |
| Compara. Ex. 2 | 100/100 | 1000 |

What is claimed is:

1. A primer composition comprising:

(I) a modified copolymer obtained by addition of a polar group represented by the following formula (1) or (2)

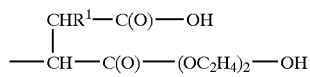

(1)

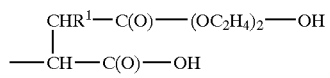

(2)

wherein in the formulas (1) and (2), $R^1$ is hydrogen or an alkyl group of 1 to 6 carbon atoms, to at least one copolymer selected from the group consisting of (A) an olefin copolymer,
(B) a halogenated olefin copolymer
(C) a styrene/conjugated diene/styrene tri-block copolymer or its hydrogenated product and
(D) a halogenated styrene/conjugated diene/styrene tri-block copolymer or its hydrogenated product, wherein the modified copolymer contains the polar group in an amount of from $1 \times 10^{-3}$ to $250 \times 10^{-3}$ mol based on 100 g of the modified copolymer, and (II) an organic solvent.

2. The primer composition according to claim 1, wherein the modified copolymer (I) is obtained by modifying a maleic anhydric-grafted copolymer with diethylene glycol.

3. The primer composition according to claim 2, wherein the maleic anhydride-grafted copolymer is maleic anhydride-grafted propylene/ethylene copolymer.

4. The primer composition according to claim 1 which has a content of the organic solvent (II) of from 100 to 4000 parts by weight based on 100 parts by weight of the modified copolymer (I).

* * * * *